(12) United States Patent
Soomro

(10) Patent No.: US 8,456,997 B2
(45) Date of Patent: Jun. 4, 2013

(54) WIRELESS COMMUNICATION SYSTEMS FOR MEDICAL DATA

(75) Inventor: Amjad A. Soomro, Hopewell Junction, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 361 days.

(21) Appl. No.: 12/989,476

(22) PCT Filed: May 4, 2009

(86) PCT No.: PCT/IB2009/051821
§ 371 (c)(1),
(2), (4) Date: Oct. 25, 2010

(87) PCT Pub. No.: WO2009/136353
PCT Pub. Date: Nov. 12, 2009

(65) Prior Publication Data
US 2011/0032822 A1    Feb. 10, 2011

Related U.S. Application Data

(60) Provisional application No. 61/051,369, filed on May 8, 2008.

(51) Int. Cl.
*H04L 12/26*    (2006.01)
(52) U.S. Cl.
USPC .......................................................... 370/235
(58) Field of Classification Search
USPC ................ 370/229, 235, 236, 241, 252–253, 370/310, 328, 338, 351, 389, 908
See application file for complete search history.

(56) References Cited

U.S. PATENT DOCUMENTS

| | | | |
|---|---|---|---|
| 6,324,384 B1 * | 11/2001 | Nobuyasu et al. | 455/74.1 |
| 7,324,491 B1 | 1/2008 | Benveniste | |
| 2003/0060173 A1 * | 3/2003 | Lee et al. | 455/103 |
| 2004/0170154 A1 | 9/2004 | Carter et al. | |
| 2005/0036448 A1 | 2/2005 | Leeuwen | |
| 2005/0135318 A1 * | 6/2005 | Walton et al. | 370/338 |
| 2005/0152373 A1 | 7/2005 | Ali | |
| 2005/0174973 A1 | 8/2005 | Kandala et al. | |
| 2005/0185613 A1 | 8/2005 | Kowalski et al. | |
| 2006/0099928 A1 | 5/2006 | Conte et al. | |
| 2007/0127378 A1 | 6/2007 | Yang et al. | |
| 2007/0127410 A1 | 6/2007 | Guo et al. | |

(Continued)

OTHER PUBLICATIONS

Baker et al., "Medical-Grade, Mission-Critical Wireless Networks", Mar. 7, 2008, IEEE Engineering in Medicine and Biology Magazine, pp. 86-95.*

(Continued)

*Primary Examiner* — Omar Ghowrwal

(57) ABSTRACT

A communication method is disclosed, comprising: (i) wirelessly communicating in compliance with an IEEE 802.11 protocol (802.11 QoS) including quality of service extensions between a wireless access point (30) and a station (20) communicating patient data; and (ii) wirelessly communicating in compliance with the 802.11 QoS protocol between a wireless access point (20) and a station (34, 38) communicating content other than patient data. The 802.11 QoS protocol is configured to perform the wireless communicating (i) at a higher priority than the wireless communicating (ii) responsive to an indication (42, 52) that the wireless communicating (i) is communicating patient data, the higher priority providing at least one of faster communication and communication at a lower error rate as compared with the wireless communicating (ii).

13 Claims, 3 Drawing Sheets

U.S. PATENT DOCUMENTS

Figure 1:
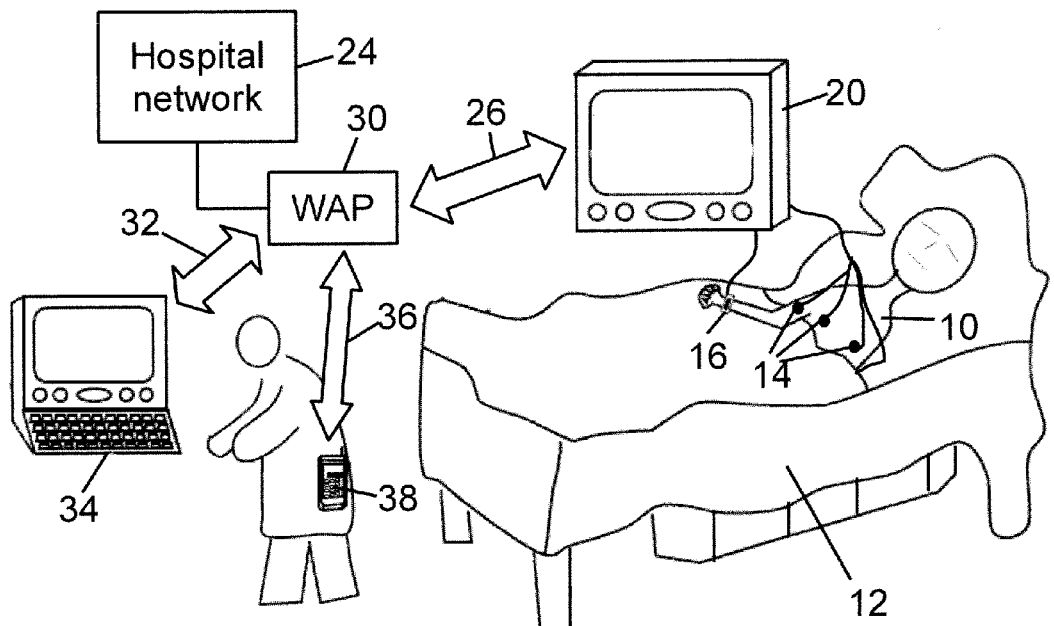

| | | | |
|---|---|---|---|
| 2007/0195818 A1 | 8/2007 | Stephenson et al. | |
| 2007/0242627 A1 | 10/2007 | Thai et al. | |
| 2008/0043688 A1* | 2/2008 | Igarashi et al. | 370/338 |
| 2009/0154393 A1* | 6/2009 | Hsu et al. | 370/328 |
| 2009/0185618 A1* | 7/2009 | Liu et al. | 375/240.01 |
| 2009/0279638 A1* | 11/2009 | Kurobe et al. | 375/295 |

OTHER PUBLICATIONS

Part II: Wireless LAN Medium Access Control (MAC) and Physical Layer (PHY) Specifications, IEEE Std. 802.11, (2007) (Revision of IEEE Std 802.11-1999).

Moura et al., "MAC Approaches for QoS Enhancement in Wireless LANs," at www.deetc.isel.ipl.pt/jetc05/JETC05/Artigos/Telecomunicacoes/Oral%20T4/111.pdf, 2005.

Baker, S. D., et al.; Medical-Grade, Mission-Critical Wireless Networks; 2008; IEEE Engineering in Medicine and Biology; 27(2)86-95.

Ni, Q., et al.; A Survey of QoS Enhancements for IEEE 802.11 Wireless LAN; 2004; Wireless Communications and Mobile Computing; Wiley; pp. 1-22.

* cited by examiner

Approximate Delay versus Loss Tolerance

WIRELESS COMMUNICATION SYSTEMS FOR MEDICAL DATA

CROSS REFERENCE TO RELATED APPLICATIONS

This application claims the benefit of U.S. provisional application Ser. No. 61/051,369 filed May 8, 2008, which is incorporated herein by reference.

The following relates to the medical arts, communication arts, and related arts. It finds application in medical monitoring, medical alarm systems, and the like, for use in hospitals, urgent care centers, homes, nursing homes, assisted care facilities, emergency medical transportation vehicles and systems, and the like.

Medical facilities are increasingly moving toward wireless data transmission links, which have advantages including, for example, elimination of wires that can impede movement of medical personnel, reduced likelihood of human error in establishing communication links, reduced cost, and so forth. Medical data links may include, for example, transmission of patient monitoring data, patient telemetry, transmission of patient alarm signals, control commands sent to interventional instruments associated with patients, and so forth.

Hospitals and other medical facilities typically already have an established wireless communication network in the form of an IEEE 802.11 compliant wireless digital network. Such IEEE 802.11 networks typically interconnect hospital computers, servers, and other local digital devices with each other and with a wider area network and/or the Internet. The IEEE 802.11 standard is a generic standard used in diverse settings ranging from home-based wireless communication networks to wireless local area networks for major corporate entities. An IEEE 802.11 compliant communication system is a multiple access/collision detection system that enables dynamic establishment of multiple concurrent communication channels. IEEE 802.11 compliant systems that employ the quality-of-service (QoS) protocol extensions operate in the following manner. A device wishing to establish communication attempts to send a transmission to a wireless access point (WAP). If the wireless channel is not busy and the WAP can immediately accommodate the new transmission channel, then it is set up. If the wireless channel is busy, the device then waits by observing the channel to be idle for a random amount of time, known as backoff stage, before attempting to transmit again. In accordance with the IEEE 802.11 standard, the device calculates the period of a backoff time determined by a procedure based on the access category of the device. After the backoff time, another attempt is made again to establish the communication link, and so forth until the link is established.

The IEEE 802.11 protocol with QoS extension establishes four user priority or access levels: voice, video, "best effort", and background. The voice level is intended for links carrying voice communications, and has the shortest stochastic backoff time. This reflects the expectation that voice communication cannot tolerate long delays. The video level has the next shortest backoff time, since video is expected to tolerate somewhat longer delays. The "best effort" level is the usual level for typical communication links carrying ordinary digital data. The background level is not commonly used, but is intended to accommodate communication links that can tolerate rather long delays, such as occasional synchronization signal transmissions and the like.

An established standard employing IEEE 802.11 with QoS extensions is known as the IEEE 802.11e standard. Such IEEE 802.11e compliant wireless digital networks are ubiquitous in hospitals and other medical settings, but they have not heretofore been widely used for communication of patient data such as patient monitoring data, patient telemetry data, and the like. One reason for this is that the collision detection employed by IEEE 802.11e dictates that any communication may experience substantial delays of unpredictable duration, which is unacceptable for life-critical data transmissions. Another difficulty with using an IEEE 802.11e compliant communications network for patient data transmission is that the standard provides no mechanism for controlling or limiting data transmission error rates. Unpredictable and uncontrolled error rates are not compatible with transmission of certain types of patient data.

One approach for addressing these difficulties is to provide a dedicated IEEE 802.11e compliant network that is used exclusively for patient data transmissions. This approach is disadvantageously duplicative of hardware, since the result is that the hospital or other medical setting has two independent and parallel IEEE 802.11e networks, one for ordinary transmissions and one for patient data transmissions. Moreover, even a dedicated IEEE 802.11e compliant network can experience overload conditions leading to long and uncontrolled delays in communication links for medical data transmissions.

Error rates for patient data transmissions can be controlled or limited using error correcting encoding of the patient data. The data is encoded prior to transmission, and at the receiving end the data is decoded and checked for accuracy based on characteristics of the error correcting encoding. However, this approach introduces additional complexity to the patient data transmission system. Error correcting encoding also introduces data redundancy in order to enable the transmission error detection, which increases the total amount of data that must be transmitted.

As another approach, during development of the IEEE 802.11e standard it was proposed to include a maximum error rate parameter for use in setting up a communication link with a maximum tolerable error rate. This proposal was not implemented in the final IEEE 802.11e standard, however, because it was believed that implementation of communication links that satisfy a maximum error rate criterion would be problematic and add undesirable complexity to the devices, WAP's, and so forth.

The following provides a new and improved apparatuses and methods which overcome the above-referenced problems and others.

In accordance with one disclosed aspect, a communication system is disclosed, comprising a communication network configured to comply with an IEEE 802.11 protocol (802.11 QoS) including quality of service extensions. The communication network includes at least one wireless access point and a plurality of stations configured to wirelessly communicate with the at least one wireless access point via the 802.11 QoS protocol, the stations including at least one station communicating patient data and at least one station communicating content other than patient data. The 802.11 QoS protocol is configured to communicate a traffic specification parameter that provides at least one of (i) faster communication and (ii) communication at a lower error rate for the at least one station communicating patient data relative to the at least one station communicating content other than patient data.

In accordance with another disclosed aspect, a communication method is disclosed, comprising: (i) wirelessly communicating in compliance with an IEEE 802.11 protocol (802.11 QoS) including quality of service extensions between a wireless access point and a station communicating patient data; and (ii) wirelessly communicating in compliance with the 802.11 QoS protocol between a wireless access point and a station communicating content other than patient data. The 802.11 QoS protocol is configured to perform the wireless communicating (i) at a higher priority than the wireless communicating (ii) responsive to an indication that the wireless communicating (i) is communicating patient data. The higher priority provides at least one of faster communication and communication at a lower error rate as compared with the wireless communicating (ii).

One advantage resides in providing an IEEE 802.11 network with QoS extensions that accommodates patient data transmissions.

Another advantage resides in providing an IEEE 802.11 network with QoS extensions that accommodates medical data transmissions with reduced delays.

Another advantage resides in providing an IEEE 802.11 network with QoS extensions that conveys medical data transmissions with reduced error rates.

Still further advantages of the present invention will be appreciated to those of ordinary skill in the art upon reading and understand the following detailed description.

FIG. 1 diagrammatically shows an 802.11 network with QoS extensions configured to communicate both patient data and other content other than patient data, with the patient data being accorded higher priority.

Figure 2:
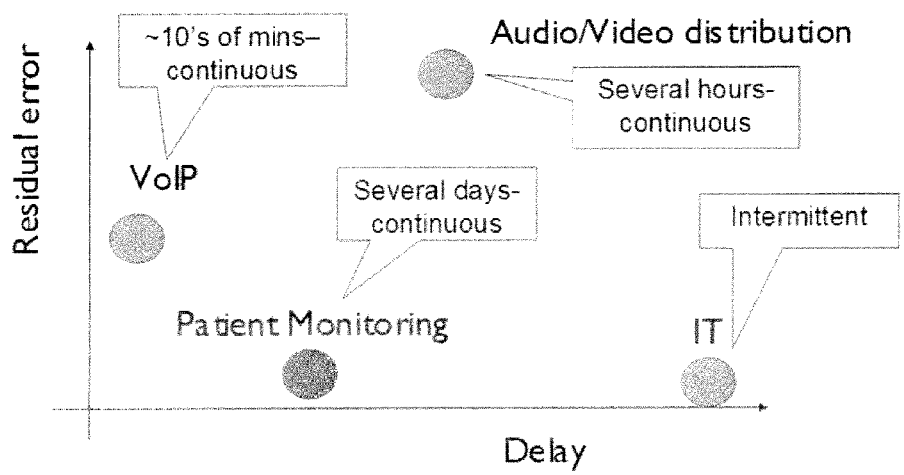

FIG. 2 plots desired delay and loss or error rate characteristics of various types of communication links.

Figure 3:
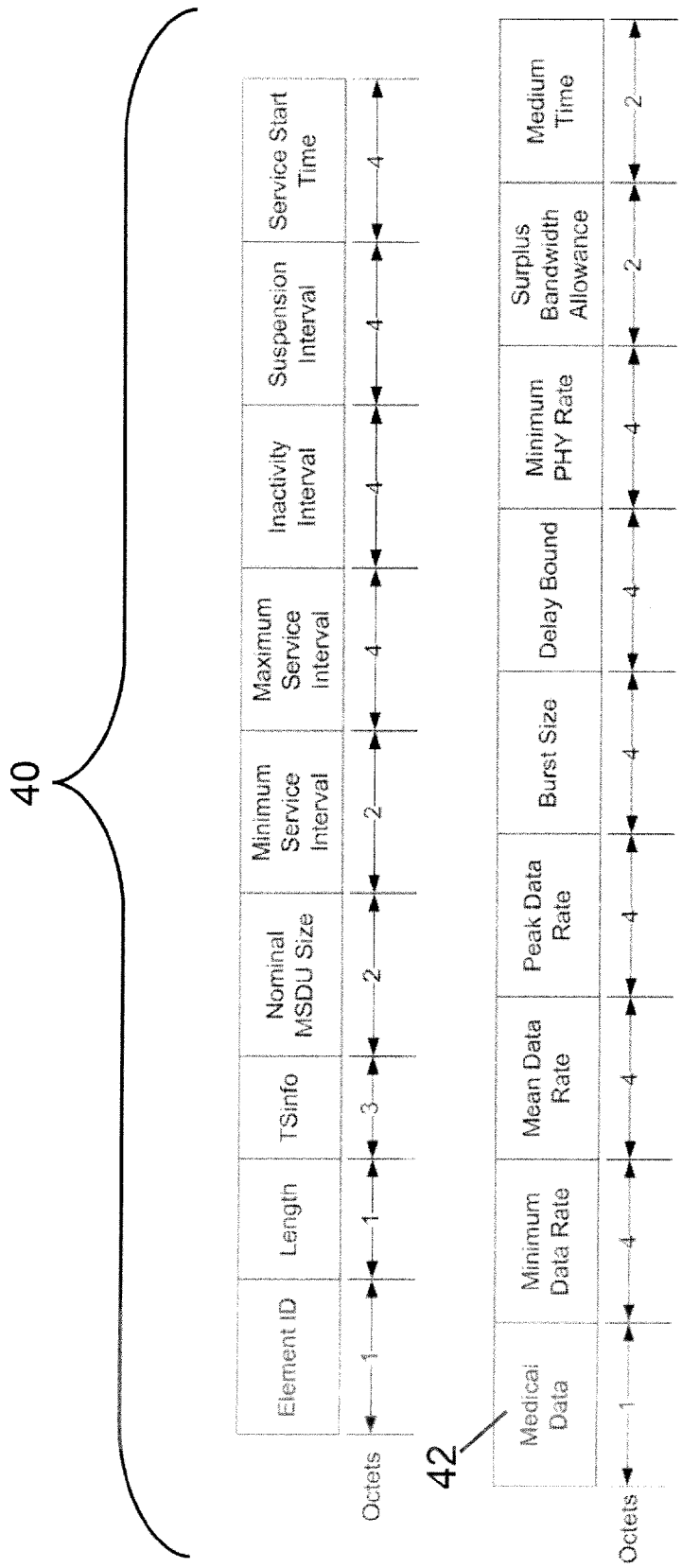

FIG. 3 diagrammatically shows a transmission specification including a designated medical data parameter.

Figure 4:
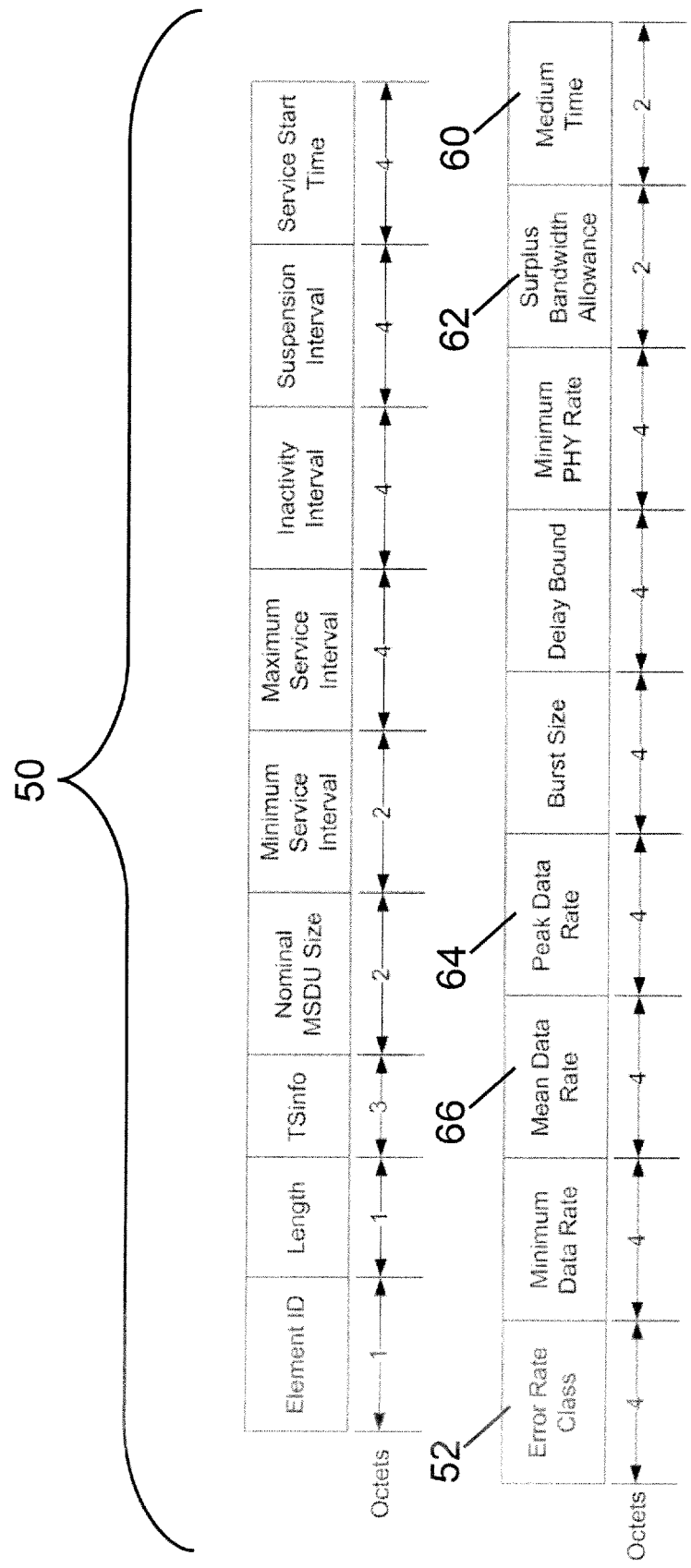

FIG. 4 diagrammatically shows a transmission specification including a designated error rate class parameter.

With reference to FIG. 1, a patient 10 is shown lying in a bed 12 such as is a typical situation in a hospital, nursing home, or other medical setting. Depending upon the patient's condition, it is also contemplated that the patient 10 may be ambulatory, residing in a wheel chair, seated in a chair, or so forth. The patient is monitored by various medical monitoring devices, including in the illustrated embodiment an electrocardiographic (ECG) instrument with ECG electrodes 14, and a wrist-based medical monitor 16, which may for example be configured to monitor blood pressure, blood oxygenation ($SpO_2$), or one or more other physiological parameters. Electronics for receiving signals from the sensors or monitors 14, 16 and for optionally performing signal processing on such signals are embodied in the illustrated embodiment as a multi-functional patient monitor 20, or may be embodied partly or wholly as on-board electronics disposed with the sensors 14, 16, or so forth.

The medical data is communicated to a hospital network 24 via a wireless communication link 26 (indicated by a double-headed arrow in FIG. 1) between the patient monitor 20 or other station and a wireless access point (WAP) 30. The description herein uses the terms "wireless access point" (WAP) and "station", the latter indicating a device communicating or attempting to communicate using the wireless communication system complying with an 802.11 protocol with quality of service (QoS) extensions. These terms are also intended to encompass wireless network nodes, or a wireless central controller.

The communication link 26 employs an IEEE 802.11 protocol including quality of service (QoS) extensions, denoted generically herein as an 802.11-QoS protocol. In some embodiments, the 802.11-QoS protocol conforms with the IEEE 802.11e standard. In some embodiments, the 802.11-QoS protocol conforms with the IEEE 802.11 EDCA standard, where the acronym "EDCA" represents "enhanced distributed channel access." The 802.11-QoS protocol may also employ a subset of the standard IEEE 802.11e protocol (i.e., some features not implemented), or may employ a superset of the standard IEEE 802.11e protocol (additional features added), or may employ a modified protocol based on IEEE 802.11e but with some features added to the standard and some standard features not implemented. The communication network including the WAP 30 employing the IEEE 802.11-QoS protocol is also suitably used to provide other communication links, such as an illustrated data link 32 between the WAP 30 and a computer 34 or other digital device or station carrying content other than patient data, and a voice communication link 36 between the WAP 30 and a portable voice communication device 38 or other station such as a portable telephone or the like. It will be appreciated that the communication links 26, 32, 36 are illustrative examples, and that typically the communication system complying with the 802.11-QoS protocol may support several, several dozen, or more such communication links. Similarly, while the single WAP 30 is illustrated, typically the communication system complying with the 802.11-QoS protocol may include one, two, three, four, ten, twenty, or more wireless access points distributed through the hospital or other medical setting to provide desired coverage area for the communication system.

With reference to FIG. 2, the desired delay and loss or error rate characteristics of various types of communication links are plotted. For example, a voice over Internet protocol (VoIP) communication link such as the illustrated communication link 36 preferably has short delays, since any substantial delay is perceived as a delay or break in the voice communication link by the participating persons. But, the VoIP communication link can tolerate a relatively high error rate. Audio/video content can typically tolerate longer delays since the streamed content is typically buffered so as to provide tolerance against stream breaks, and can also tolerate rather high error rates.

On the other hand, information technology (IT) links, that is, data links such as the illustrative data communication link 32 of FIG. 1 can tolerate rather long delays, but are very sensitive to error rate. For example, a typical data communication link transmits data packets encoded in a manner that permits detection of transmission errors at the receiving end. An error in the data packet transmission is typically remedied by resending the entire data packet. Accordingly, a data communication link with a high error rate can result in a large proportion of data packets being retransmitted once or possibly several times each, which is undesirable.

FIG. 2 also shows a data point for a typical patient monitoring link, such as the illustrative communication link 26 carrying patient data such as patient monitoring data, patient telemetry data, and the like. A communication link carrying patient data is somewhat more tolerant of delays than voice links, but is less delay-tolerant than audio/video or non-patient data links. Moreover, some communication links carrying non-routine patient data (not shown in FIG. 2) such as medical emergency data may be less tolerant of delays than the example link diagrammatically plotted in FIG. 2. Communication links carrying patient data also have low tolerance for errors. Due to the potentially life-critical nature of patient data, generally few errors can be tolerated.

With reference back to FIG. 1, to accommodate one or more communication links 26 carrying patient data in the general-purpose communication system complying with the 802.11-QoS protocol shown in FIG. 1, the 802.11-QoS protocol is adjusted to perform communication on data links carrying patient data at a higher priority than communication on data links carrying content other than patient data. The higher priority provides at least one of (i) faster communication and (ii) communication at a lower error rate as compared with data links of lower priority. In one suitable approach, the 802.11-QoS protocol is configured to communicate a traffic specification parameter having a first value that provides higher priority for communication links conveying patient data and has a second (or third, or other) value that provides lower priority for communication links carrying content other than patient data.

With reference to FIG. 3, for example, a traffic specification (TSPEC) layout 40 is shown, which diagrammatically shows a TSPEC that is communicated during initialization of a communication link under the 802.11 EDCA protocol. The TSPEC layout shown in FIG. 3 is adjusted as compared with a conventional 802.11 EDCA protocol by inclusion of a medical data parameter 42. The conventional 802.11 EDCA protocol is further adjusted to define a plurality of allowable values for the medical data parameter 42 that are indicative of whether the communication link under initialization is for communicating patient data. In the TSPEC layout shown in FIG. 3, the medical data parameter 42 is one octet in length; however, the medical data parameter can be as small as a single bit having only two allowable values: one allowable value indicating the communication link being initialized is for communicating patient data, and the other allowable value indicating the communication link being initialized is for communicating content other than patient data. If the medical data parameter is larger, e.g. two bits allowing up to four possible allowable values, or three bits allowing up to eight possible allowable values, or in general n bits allowing for up to $2^n$ possible allowable values, then the medical data parameter 42 can optionally have other values indicating communication links being initialized for communicating different types of patient data. For example, in one contemplated embodiment the medical data parameter 42 has at least three bits and the 802.11-QoS protocol is configured to define six allowable values, for example enumerated as follows:

0—The communication link is not for patient data
    1—The communication link is for routine patient monitoring data
    2—The communication link is for emergency patient data
    3—The communication link is for patient data indicating an alarm
    4—The communication link is for patient data for device control
    5—The communication link is for patient data indicating device status.

These are illustrative examples, and different, more, fewer, or other values can be defined in other embodiments of the 802.11-QoS protocol. Moreover, it will be appreciated that the medical data parameter 42 can be included at a position in the TSPEC other than the position illustrated as an example in FIG. 3.

In the approach described with reference to FIG. 3, the medical data parameter 42 is included in the TSPEC of the communication link stream requesting admission in a wireless network. In another contemplated embodiment, the medical data parameter is attached with every protocol frame carrying medical data, indicating whether it is a medical data, and, if so, optionally which type. In another contemplated embodiment, the medical data parameter is transmitted as a beacon indicating that the wireless network support carrying of medical data.

In various contemplated embodiments, a wireless access point 30 upon receipt of an admission request from a station gives preferential treatment of admission to the stream if the stream is identified as containing patient data when determining which stream to service or to deny admission. Also, subsequently, a wireless access point gives preferential treatment to the stream if the stream is identified as containing patient data when determining which stream to transmit. The preferential treatment may take the form of giving higher stochastic probabilities of accessing the wireless medium to the streams containing patient data. This can be accomplished, for example, by assigning a relatively shorter random backoff time for communication links carrying patient data and a relatively longer random backoff time for communication links carrying content other than patient data. In a variant approach, the wireless access point may give priority to transmission of a data frame identified as containing patient data.

In the embodiment of FIG. 3, the dedicated medical data parameter 42 is used to indicate that a communication link is, or will be, carrying patient data, and optionally may indicate what type or kind of patient data as well. This implementation entails modifying a conventional 802.11e protocol to include and interpret the added dedicated medical data parameter 42. In some embodiments, however, it may be desired to not modify the layout of the TSPEC.

Accordingly, in some embodiments an existing parameter of the TSPEC is defined as the medical data parameter. For example, in a hospital or other medical setting the video mode is not commonly used. Accordingly, in some embodiments the access category traffic specification parameter is utilized as the medical data parameter, by re-defining the video mode or access category as a patient data mode or category. In the conventional 802.11e protocol, the priority ordering of the access categories is:

AC_BK<AC_BE<AC_VI<AC_VO where AC_BK denotes the background access category, AC_BE denotes the "best effort" access category, AC_VI denotes the video access category, and AC_VO denotes the voice access category. The conventional priority ordering reflects the acceptable delays for each access category as depicted, for example, in FIG. 2. Parameters such as the backoff time are set based on the priority ordering, so that initialization of a communication link for the voice access category has the shortest backoff time and hence a high likelihood of quickly being granted access.

In embodiments in which the video access category is redefined as carrying patient data, the illustrative communication link 26 of FIG. 1 carrying patient data is assigned access category AC_VI, that is, video mode, and hence has the highest priority except for voice communication links. Optionally, the priority ordering is also modified to the following priority ordering:

AC_BK<AC_BE<AC_VO<AC_VI so that the video mode AC_VI used in these embodiments to identify communication links carrying patient data are assigned the highest priority of all access categories. Another contemplated priority ordering for these embodiments has AC_VO=AC_VI so that voice and video (i.e., patient data) have the same priority.

In IEEE 802.11-EDCA, differentiation for each access category is achieved by varying: (i) the amount of time a station senses the channel to be idle before backoff or transmission denoted as AIFSN; (ii) the length of the contention windows to be used for the backoff time denoted CWmin and CWmax; and (iii) the duration a station may transmit after it acquires the channel denoted TXOP. Typically, the wireless access point 30 transmits these settings as a beacon, and the receiving stations set their parameters accordingly based on the access category of each station.

In one embodiment in which the AC_VI mode is used as the medical data parameter value denoting a communication link carrying patient data, AIFSN for both AC_VI and AC_VO is set to the same value, for example to a value of 2, and CWmax chosen such that AC_VO CWmax>AC_VI CWmax. In another embodiment, AIFSN for both AC_VI and AC_VO is set to the same number, for example to a value of 2, and CWmin chosen such that AC_VO CWmin>AC_VI CWmin. In another embodiment, AIFSN for both AC_VI and AC_VO is set to the same value, CWmax chosen such that AC_VO CWmax>AC_VI CWmax, and CWmin chosen such that AC_VO CWmin>AC_VI CWmin. Other variations in parameter values are also contemplated.

In some other embodiments, the 802.11-QoS protocol is adjusted to perform wireless communicating of patient data at a higher priority than wireless communicating of content other than patient data by adjusting the error rate.

With reference to FIG. 4, a traffic specification (TSPEC) layout 50 is shown, which diagrammatically shows a TSPEC that is communicated under the 802.11 EDCA protocol. The TSPEC layout shown in FIG. 4 is adjusted as compared with a conventional 802.11 EDCA protocol by inclusion of an error rate class parameter 52. The conventional 802.11 EDCA protocol is further adjusted to define a plurality of allowable values for the error rate class parameter 52 that cause the 802.11-QoS protocol to be modified to provide relatively higher or lower error rates. In the TSPEC layout shown in FIG. 4, the error rate class parameter 52 is four octets in length; however, the error rate class parameter can be as small as a single bit capable of defining only two allowable error rate classes, and more generally is capable of defining up to $2^n$ allowable error rate classes for an error rate class parameter of n bits.

In some embodiments, a first error rate class value is assigned for any station communicating patient data, while a second (or optionally third, fourth, or additional) error rate class value is assigned to stations communicating content other than patient data. The first error rate class value assigned for communication links communicating patient data preferably corresponds to a lower error rate, at least on average, than the second or other error rate class value assigned to stations communicating content other than patient data.

One approach for implementing error rate control is to define a maximum error rate for each error rate class. However, this approach entails substantial modification of the 802.11-QoS protocol. Accordingly, in some preferred embodiments the conventional 802.11 EDCA protocol is adjusted less aggressively in order to provide higher priority in the form of a statistically lower error rate for communication links conveying patient data.

In another approach, the 802.11 QoS protocol is configured to assign a relatively higher surplus bandwidth allowance 62 for those communication links assigned the first error rate class value (that is, links communicating patient data) as compared with those communication links assigned the other error rate class values (that is, links communicating content other than patient data). Allocating a relatively higher surplus bandwidth allowance 62 enhances the likelihood of accurate transmission and hence is expected to statistically lower the error rate. Again, a lower statistical error rate also facilitates faster communication for communication links conveying patient data.

In another approach, the 802.11 QoS protocol is configured to assign a relatively lower statistical data rate for those communication links assigned the first error rate class value (that is, links communicating patient data) as compared with those communication links assigned the other error rate class values (that is, links communicating content other than patient data). The relatively lower statistical data rate can be, for example, a lower peak data rate 64, a lower mean data rate 66, or both. By lowering the statistical data rate for links conveying patient data, the likelihood of accurate transmission is increased statistically, and so the error rate statistically decreases.

These are merely illustrative examples, and various combinations of these parameters, or other parameters, of the 802.11 QoS protocol can be adjusted to reduce the error rate for those communication links assigned the first error rate class value (that is, links communicating patient data) as compared with those communication links assigned the other error rate class values (that is, links communicating content other than patient data). Moreover, the illustrated error rate class parameter 52 is an example, and the error rate class parameter can be located elsewhere in the transmission specification, or can be embedded in the existing transmission specification. For example, the video access category AC_VI of the access category traffic specification parameter can be redefined as identifying a communication link carrying patient data. The medium time, surplus bandwidth allowance, PHY data rate, or other parameter or combination of parameters of the 802.11 QoS protocol are then suitably adjusted for those communication links identified by the AC_VI access category as carrying patient data so as to provide a lower error rate, on average, for those links.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A communication system comprising:
   a communication network configured to employ an IEEE 802.11 protocol 802.11-QoS including quality of service extensions, the communication network including:
      at least one wireless access point, and
      a plurality of stations configured to wirelessly communicate with the at least one wireless access point via the 802.11-QoS protocol, the stations including at least one station communicating patient data and at least one station communicating content other than patient data,
   the 802.11-QoS protocol configured to communicate a medical data parameter that provides at least one of:
      (i) faster communication for the at least one station communicating patient data relative to the at least one station communicating content other than patient data, and
      (ii) communication at a lower error rate for the at least one station communicating patient data relative to the at least one station communicating content other than patient data;
   wherein the 802.11-QoS protocol defines a plurality of allowable values for the medical data parameter that are indicative of whether a communication link is for communicating patient data, the plurality of allowable values including:
      at least one allowable value for the medical data parameter that indicates the communication link is not for communicating patient data, and
      one or more additional allowable values for the medical data parameter each of which indicates the communication link is for communicating patient data, the one or more additional allowable values including:
         a second allowable value for the medical data parameter that indicates the communication link is for communicating routine patient data, and
         a third allowable value for the medical data parameter that indicates the communication link is for communicating non-routine patient data having a higher priority than routine patient data.

2. A communication system comprising:
   a communication network configured to employ an IEEE 802.11 protocol (802.11-QoS) including quality of service extensions and providing communication modes including (i) a voice mode (AC_VO), (ii) a video mode (AC_VI), (iii) a best effort mode (AC_BE), and (iv) a background mode (AC_BK), the communication network including:
      at least one wireless access point, and
      a plurality of stations configured to wirelessly communicate with the at least one wireless access point via the 802.11-QoS protocol, the stations including at least one station communicating patient data and at least one station communicating content other than patient data,
   the 802.11-QoS protocol configured to communicate a traffic specification parameter that provides at least one of:
      (i) faster communication for the at least one station communicating patient data relative to the at least one station communicating content other than patient data, and (ii) communication at a lower error rate for the at least one station communicating patient data relative to the at least one station communicating content other than patient data wherein the traffic specification parameter is an access categorization parameter having a value corresponding to one of (i) the voice mode (AC_VO), (ii) the video mode (AC_VI), (iii) the best effort mode (AC_BE), and (iv) the background mode (AC_BK), and wherein the 802.11-QoS protocol is configured to assign the video mode value (AC_VI) to the at least one station communicating patient data, and wherein the 802.11-QoS protocol is further configured to provide at least one of:
(i) faster communication for the video mode (AC_VI) as compared with each of the voice, best effort, and background modes (AC_VO, AC_BE, AC_BK), and
(ii) communication at a lower error rate for the video mode (AC_VI) as compared with each of the voice, best effort, and background modes (AC_VO, AC_BE, AC_BK).

3. The communication system as set forth in claim 2, wherein the 802.11-QoS protocol is configured to reduce communication link initialization time for the at least one station communicating patient data relative to communication link initialization time for the at least one station communicating content other than patient data by assigning a relatively shorter random backoff time for the at least one station communicating patient data and a relatively longer random backoff time for the at least one station communicating content other than patient data.

4. The communication system as set forth in claim 2, wherein the 802.11-QoS protocol is configured to assign an error rate class for a communication link with a station, a first error rate class value corresponding to a lower error rate being assigned for the communication link with the at least one station communicating patient data, a second error rate class value corresponding to a higher error rate being assigned for the at least one station communicating content other than patient data.

5. The communication system as set forth in claim 4, wherein the 802.11-QoS protocol is configured to assign a relatively higher medium time for those communication links assigned the first error rate class value as compared with those communication links assigned the second error rate class value.

6. The communication system as set forth in claim 4, wherein the 802.11-QoS protocol is configured to assign a relatively higher surplus bandwidth allowance for those communication links assigned the first error rate class value as compared with those communication links assigned the second error rate class value.

7. The communication system as set forth in claim 4, wherein the 802.11-QoS protocol is configured to assign a relatively lower PHY data rate for those communication links assigned the first error rate class value as compared with those communication links assigned the second error rate class value.

8. A communication method comprising:
(ia) wirelessly communicating in compliance with an IEEE 802.11 protocol (802.11-QoS) including quality of service extensions via a communication link between a wireless access point and a station communicating routine patient data;
(ib) wirelessly communicating in compliance with the IEEE 802.11 protocol (802.11-QoS) including quality of service extensions via a communication link between a wireless access point and a station communicating non-routine patient data having a higher priority than routine patient data;
(ii) wirelessly communicating in compliance with the 802.11-QoS protocol via a communication link between a wireless access point and a station communicating content other than patient data;

wherein the 802.11-QoS protocol is configured to communicate a medical data parameter for each communication link that provides at least one of:
faster communication for the wireless communicating (ia, ib) of routine or non-routine patient data relative to the wireless communicating (ii) of content other than patient data, and
communication at a lower rate for the wireless communicating (ia, ib) of routine or non-routine patient data relative to the wireless communicating (ii) of content other than patient data; and wherein the 802.11-QoS protocol defines a plurality of allowable values for the medical data parameter of each communication link including:
at least one allowable value for the medical data parameter that indicates the communication link is not for communicating patient data, and
one or more additional allowable values for the medical data parameter each of which indicates the communication link is for communicating patient data, the one or more additional allowable values including:
a second allowable value for the medical data parameter that indicates the communication link is for communicating routine patient data, and
a third allowable value for the medical data parameter that indicates the communication link is for communicating non-routine patient data having a higher priority than routine patient data.

9. The communication method as set forth in claim 8, wherein the 802.11-QoS protocol is configured to:
initiate the wireless communicating (ia) using a first random backoff time; and
initiate the wireless communicating (ii) using a second random backoff time that is stochastically longer than the first random backoff time.

10. The communication method as set forth in claim 8, wherein the 802.11-QoS protocol is configured to:
perform the wireless communications (ia) in conformance with a relatively lower error rate class as compared with the wireless communicating (ii) responsive to the value of the medical data parameter indicating that the wireless communicating (ia) is communicating patient data.

11. The communication method as set forth in claim 10, wherein the 802.11-QoS protocol is configured to perform the wireless communicating (ia) using a relatively higher medium time as compared with the wireless communicating (ii) responsive to the value of the medical data parameter indicating that the wireless communicating (ia) is communicating patient data.

12. The communication method as set forth in claim 10, wherein the 802.11-QoS protocol is configured to perform the wireless communicating (ia) using a relatively higher surplus bandwidth as compared with the wireless communicating (ii) responsive to the value of the medical data parameter indicating that the wireless communicating (ia) is communicating patient data.

13. The communication method as set forth in claim 10, wherein the 802.11-QoS protocol is configured to perform the wireless communicating (ia) using a relatively lower PHY data rate as compared with the wireless communicating (ii) responsive to the value of the medical data parameter indicating that the wireless communicating (ia) is communicating patient data.

* * * * *